(12) United States Patent
van Brakel et al.

(10) Patent No.: US 8,528,382 B2
(45) Date of Patent: Sep. 10, 2013

(54) CALIBRATION DEVICE FOR MASS FLOW METERS

(75) Inventors: Pieter Cornelis Leendert van Brakel, Mijnsheerenland (NL); Aart Jan van Bekkum, Hoornaar (NL)

(73) Assignee: Krohne AG, Basel (CH)

( * ) Notice: Subject to any disclaimer, the term of this patent is extended or adjusted under 35 U.S.C. 154(b) by 295 days.

(21) Appl. No.: 12/974,387

(22) Filed: Dec. 21, 2010

(65) Prior Publication Data

US 2011/0239730 A1 Oct. 6, 2011

(30) Foreign Application Priority Data

Apr. 6, 2010 (DE) .......................... 10 2010 014 038

(51) Int. Cl.
*G01N 29/00* (2006.01)
(52) U.S. Cl.
USPC ............................................. 73/1.83; 73/1.82
(58) Field of Classification Search
USPC .................. 73/1.01, 1.02, 1.82, 1.03, 1.83
See application file for complete search history.

(56) References Cited

U.S. PATENT DOCUMENTS

| | | | | |
|---|---|---|---|---|
| 3,741,014 A | * | 6/1973 | Tamura | 73/861.25 |
| 4,208,908 A | * | 6/1980 | Hickox | 73/861.26 |
| 5,280,728 A | * | 1/1994 | Sato et al. | 73/861.28 |
| 5,455,781 A | | 10/1995 | Reynal et al. | |
| 5,705,753 A | | 1/1998 | Hastings et al. | |
| 7,159,472 B1 | * | 1/2007 | Hastings et al. | 73/861.27 |
| 2009/0064757 A1 | * | 3/2009 | Calabrese | 73/1.73 |
| 2009/0178490 A1 | | 7/2009 | Konzelmann et al. | |

FOREIGN PATENT DOCUMENTS

| | | |
|---|---|---|
| DE | 100 57 188 A1 | 5/2002 |
| EP | 2 072 972 A1 | 6/2009 |
| JP | 11-230800 A | 8/1999 |
| JP | 2006-337313 A | 12/2006 |

* cited by examiner

*Primary Examiner* — Hezron E Williams
*Assistant Examiner* — David Z Huang
(74) *Attorney, Agent, or Firm* — Roberts Mlotkowski Safran & Cole, P.C.

(57) ABSTRACT

A calibration device for mass flow meters including a test piece measuring section into which the mass flow meter test piece to be calibrated can be inserted, a device for creating a flow of a medium through the test piece measuring section and a temperature-measuring device positioned in the test piece measuring section for detecting the temperature of the medium. The temperature-measuring device is position in the flow such that the flow is disturbed as little as possible, while at the same time being capable of highly-accurate detection of the temperature of the flowing medium. In particular, the temperature-measuring device is an ultrasonic temperature-measuring device that is configured to emit an ultrasonic signal into the medium and determine the temperature of the medium by measuring a speed of the emitted ultrasonic signal.

11 Claims, 6 Drawing Sheets

CALIBRATION DEVICE FOR MASS FLOW METERS

BACKGROUND OF THE INVENTION

1. Field of Invention

The invention relates to a calibration device for mass flow meters and a method for calibrating a mass flow meter using such a calibration device, and more particularly, to a calibration device having at a test piece measuring section, a device for creating a flow of a medium through the test piece measuring section and a temperature-measuring device in the test piece measuring section for detecting the temperature of the medium and a method for calibrating a mass flow meter using such a calibration device.

2. Description of Related Art

Calibration devices of the above-mentioned type have been known for a long time from the related art. Calibration serves the purpose of detecting the deviation of the measurement of the mass flow meter test piece from a standard value provided by the calibration device in order to calibrate the mass flow meter test piece using the deviation. Such calibration devices are also used in the calibration of mass flow meters, wherein, the conformity with certain accuracy requirements is approved by certified institutes, such as, for example, the German Physikalisch-Technische Bundesanstalt. The requirement of calibration and repeated calibration of a mass flow meter results in part from the field of application of mass flow meters, for example, the transportation of oil for custody transfer in which only calibrated mass flow meters may be used.

Additionally, a high accuracy is always desired from a technical perspective. In particular, regarding high-grade fluid or gaseous goods, such as crude oil and natural gas, there is a large interest, from the distributors point of view, that the amount to be delivered and only that amount is actually delivered, and from the purchasers point of view, that the requested amount, especially at least the requested amount, is received. Measurement tolerances always impact one of the parties in trade and they usually impact the distributor.

The standard value with which the measurement of the mass flow meter test piece is compared can exist in the form of a standard measuring device, which is also placed in the test piece measuring section. In this manner the standard measuring device is subjected to the same flow as the mass flow meter test piece to be calibrated arranged at a distance away in the test piece measuring section. This is valid, in particular in gaseous media, insofar as other variables influencing the mass or volume flow within the medium are stationary, or at least are stationary for as long as the standard measuring device and the mass flow meter test piece have carried out their measurement under the same conditions. Normally, calibration devices also include pressure measuring devices, since, in particular in gaseous media, the pressure has a large influence on the density of the medium. Thus, pressure represents an important variable for such mass flow meters that are based on the measurement of the flow speed of the medium, as is the case in, for example, with the use of ultrasonic mass flow meters, as opposed to measuring devices that allow a direct conclusion about the mass flow due to their measuring principle, for example, in Coriolis mass flow meters.

Often, a standard value is also implemented as a volumetric standard value in which a geometrically measured reference volume, for example, in the form of a plunger system, is pushed in the volume of the test piece measuring section in a certain time such that the flow can be adjusted very accurately using the test piece measuring section.

The temperature-measuring device in the calibration device, mentioned above, is necessary or advantageous for an accurate calibration for different reasons. Firstly, the exact detection of the temperature of the medium is of interest for calibrating mass flow meter test pieces at different operating temperatures. Secondly, the temperature of the medium also substantially influences the calibration device. For example, geometric measurements of the tube system of the calibration device are dependent on the temperature of the medium, in particular thermal expansion or contraction.

It is known from the related art to detect the temperature of the medium with high accuracy using invasive temperature probes, i.e., temperature sensors that extend into the volume flowing through the test piece measuring section. Generally, temperature probes are used that are based on changes in electrical impedance, for example, platinum temperature sensors that are arranged in the tip of a measuring tube extending into the flow of the medium. In this instance, temperature measurement occurs with high accuracy. However, the invasive temperature probe has the disadvantage that the flow at the measurement point and downstream from the measurement point have substantial disturbances such that the flow in the calibration device cannot be produced as steadily, in total, as is necessary for a highly accurate measurement. A further disadvantage is that an invasive temperature-measuring device only provides selective temperature information, which does not allow the measurement of temperatures changing along a flow profile, i.e., the identification of a temperature profile. This can be avoided by measuring the temperature with temperature probes at different points in the flow profile or in a flow cross-section. However, this is very disadvantageous because the number of disturbances induced in the flow to be measured is then increased.

SUMMARY OF THE INVENTION

It is thus a primary object of the present invention to provide a calibration device for mass flow meters with which the disadvantages in the calibration devices known from the related art can be avoided. In particular, the primary object of the present invention is to provide a calibration device for a disturbance-free as possible and highly-accurate detection of the temperature of the flowing medium.

The primary object is achieved in an aspect of the invention that includes a calibration device with a temperature-measuring device that is designed as an ultrasonic temperature-measuring device. Consequently, the temperature of the medium is determined using the speed of an emitted ultrasonic signal in the medium. The ultrasonic temperature-measuring device does not extend into the flow cross-section of the test piece measuring section, and thus the flow in the test piece measuring section is essentially unaffected by the ultrasonic temperature-measuring device.

In ultrasonic temperature measurement the sonic velocity within a medium depends on the temperature of the medium. This relationship is applied such that when one is provided with a known path length of the ultrasonic signal from the sender to the receiver, the temperature of the medium can be deduced from the measurement of the running time.

The advantage initially achieved from the use of an ultrasonic temperature-measuring device for determining the temperature of the medium is that the flow remains uninfluenced for the most part. This advantage is achieved because the flow is not disturbed, as opposed to temperature measurement in the related art which generally involves an invasive temperature-measuring device.

A further advantage of the use of an ultrasonic temperature-measuring device is that it determines a changing temperature of the medium practically immediately. The measuring time is solely the time in which the ultrasonic signal needs to proceed through the signal path in the test piece measuring section, wherein such a signal path typically runs perpendicular to the direction of flow. Thus, the ultrasonic temperature-measuring device also allows for the detection of quick temperature changes of the medium.

A further advantage of the use of an ultrasonic temperature-measuring device is that an average temperature value over the path of the ultrasonic signal in the test piece measuring section is detected rather than only a temperature at one point within the flowing medium being detected. An average temperature value over the path of the ultrasonic signal in the test piece measuring section is detected because the ultrasonic signal is always propagated with a speed corresponding to a temperature of the medium in areas of different temperature and the running time of the ultrasonic signal acting as the actual measured value automatically describes the average temperature along the signal path of the ultrasonic signal.

The ultrasonic temperature-measuring device is preferably provided in the test piece measuring section where the mass flow meter test piece to be calibrated is inserted. More preferably, the ultrasonic temperature-measuring device is provided on the incoming end of the mass flow meter test piece. Additionally, it can also be advantageous to provide an additional ultrasonic temperature-measuring device at the outgoing end of the mass flow meter test piece in the test piece measuring section. Accordingly, changes in temperature in close proximity to the mass flow meter test piece can be identified and taken into account.

According to a another aspect of the invention, it is provided that an invasive reference temperature-measuring device and an associated reference ultrasonic temperature-measuring device are arranged adjacent to one another in the calibration device. This arrangement provides for the flow in the test piece measuring section in the area of the ultrasonic temperature-measuring device and in the area of the mass flow meter test piece to be essentially unaffected by the invasive reference temperature-measuring device. Thus, the ultrasonic speed in the medium can be determined with the reference ultrasonic temperature-measuring device at the medium temperature determined using the invasive reference temperature-measuring device.

The above-mentioned another aspect of the invention has substantial advantages. Due to the adjacent arrangement of the invasive reference temperature-measuring device and the associated reference ultrasonic temperature-measuring device, it is possible to detect a reliable correlation between the ultrasonic speed and the temperature of the same medium, which is used in the calibration device. For this reason, it is not necessary to use mathematical/physical relations that describe the temperature dependence of the ultrasonic speed in the medium, since such relations are not even known in some circumstances for a specific medium or, at any rate, are not known well enough. There is also no longer the necessity to have exact knowledge of the medium with which the measurement is carried out, since the relation between sonic velocity and medium temperature is determined metrologically in the calibration device itself.

When it is said that the invasive reference temperature-measuring device and the associated reference ultrasonic temperature-measuring device are arranged adjacent to one another, it is meant that they are arranged as close to one another as possible, so that the measurement given by them is practically always related to one and the same section of the flowing medium. For this reason, the probability is decreased that, in the case of a temporal change of the temperature of the medium, this change has already been detected by one of the reference measuring devices, while the other of the two reference measuring devices could not have yet noticed this change within the medium. Preferably, the invasive reference temperature-measuring device is arranged downstream from the associated reference ultrasonic temperature-measuring device so that disturbances induced in the flow from the invasive reference temperature-measuring device do not affect the reference ultrasonic temperature-measuring device.

When it is further discussed that the flow in the test piece measuring section in the area of the ultrasonic temperature-measuring device and in the area of the mass flow meter test piece is essentially not influenced by the invasive reference temperature-measuring device, it is meant that disturbances in the flow induced by the invasive reference temperature-measuring device at the location of the ultrasonic temperature-measuring device and at the location of the mass flow meter test piece to be calibrated are practically dissipated, e.g., the turbulent kinetic energy of the flow is dissipated to at least 90% after the invasive reference temperature-measuring device at the location of the ultrasonic temperature-measuring device and at the location of the mass flow meter test piece.

The great advantage of equipping the calibration device according to the invention with an invasive reference temperature-measuring device and an associated reference ultrasonic temperature-measuring device is then achieved when the relation obtained from the reference measurement between the ultrasonic speed $v_{ref}$ in the medium and the medium temperature $T_{ref}$ is the basis for the temperature measurement with the ultrasonic temperature-measuring device in the test piece measuring section. Because, in this aspect, the ultrasonic temperature-measuring device, which is preferably located close to the mass flow meter test piece, is best calibrated to the special temperature dependency of the sonic velocity in the medium currently being used within the calibration device.

There are various possibilities for arranging the reference measuring devices in the calibration device such that the ultrasonic measuring device and the mass flow meter test piece remain as much undisturbed as possible. According to another aspect of the invention, it is provided that the invasive reference temperature-measuring device and the associated reference ultrasonic temperature-measuring device are arranged in the test piece measuring section. For example, the invasive reference temperature-measuring device and the associated reference ultrasonic temperature-measuring device, can be arranged downstream from the ultrasonic temperature-measuring device and the mass flow meter test piece. Alternatively, the reference measuring devices can be arranged a predetermined distance upstream from the ultrasonic temperature-measuring device and the mass flow meter test piece such that the disturbances created by the invasive reference temperature-measuring device do not affect the ultrasonic temperature-measuring device and the mass flow meter test piece.

According to an alternative aspect of the inventions, it is provided that a by-pass to the test piece measuring section is implemented in the calibration device and the invasive reference temperature-measuring device and the associated reference ultrasonic temperature-measuring device are arranged in the by-pass. Due to the by-pass to the test piece measuring section, it is essentially possible to channel off medium flowing from the test piece measuring section and to examine it with the invasive reference temperature-measuring device and the associated reference ultrasonic temperature-measuring device. This enables the reference measurement and the measurement in the flow of the test piece measuring section, in which the mass flow meter test piece to be calibrated is located, to be locally de-coupled, which prevents a mutual influencing of the reference measurement and the measurement in the test piece measuring section.

It has been seen to be of particular advantage when the by-pass can be de-coupled in terms of flow from the test piece measuring section by means of stop valves, i.e., the by-pass can be opened and closed to the test piece measuring section. Therefore, when the by-pass is closed a reference measurement can also occur with a large as possible flow-related de-coupling from the test piece measuring section.

According to a particularly preferred aspect of the invention, it is provided that the by-pass forms a by-pass loop. In particular, a conveying device and/or a heating device and/or a cooling device for the medium are provided in the by-pass loop. This opens up a plurality of possibilities for carrying out reference measurements independently of the occurrences in the test piece measuring section, since the flow in the by-pass loop and in the test piece measuring section are influenced independent of one another. The medium in the by-pass loop can be circulated with the conveying device, which is usually designed as a pump. In particular, it is ensured that a homogeneous state of the medium is regulated within the by-pass loop. More specifically, a constant temperature is regulated. The temperature of the medium can be influenced by the conveying device but also with the use of the above-mentioned heating or cooling devices. In this manner, a plurality of reference measurements can be easily carried out parallel to the test piece measuring section, so that the correlation $v_{ref}=f(T_{ref})$ between the ultrasonic speed $v_{ref}$ in the medium and the medium temperature $T_{ref}$ can be very accurately and easily determined, also, in terms of time, parallel or before the measurements on the mass flow meter test piece.

The tasks derived are accomplished by a method for calibrating a mass flow meter with the above-described calibration device, wherein the calibration device has at least one test piece measuring section, into which the mass flow meter test piece to be calibrated can be inserted, at least one device for creating a flow of a medium through the test piece measuring section and at least one temperature-measuring device in the test piece measuring section for detecting the temperature of the medium. The temperature-measuring device is further designed as an ultrasonic temperature-measuring device, an invasive reference temperature-measuring device and an associated reference ultrasonic temperature-measuring device that are arranged adjacent to one another in the calibration device in such a manner that the flow in the test piece measuring section in the area of the ultrasonic temperature-measuring device and in the area of the mass flow meter test piece are essentially not influenced by the invasive reference temperature-measuring device.

Thus, with the reference ultrasonic temperature-measuring device, the ultrasonic speed $v_{ref}$ in the medium can be determined using the medium temperature $T_{ref}$ determined by the invasive reference temperature-measuring device. According to the method of the invention, it is provided that a measurement of the ultrasonic speed by means of the reference ultrasonic temperature-measuring device and a measurement of the medium temperature by means of the invasive reference temperature-measuring device are carried out in the calibration device and the relation $v_{ref}=f(T_{ref})$ between the ultrasonic speed $v_{ref}$ in the medium and the medium temperature $T_{ref}$ obtained from these measurements forms the basis for the temperature measurement with the ultrasonic temperature-measuring device in the test piece measuring section.

As has already been described referring to the calibration device according to the invention, the advantage of this approach is that a highly accurate reference measurement can be carried out in the calibration device with the medium, which is also used for calibrating the mass flow meter test piece. Additionally, a quick measurement of the temperature can be carried out in the test piece measuring section averaged over the signal path of the ultrasonic signal, also in the immediate proximity of the mass flow meter test piece, wherein a maximum accuracy of the ultrasonic temperature-measuring device is given by using the relation $v_{ref}=f(T_{ref})$ found via the reference measurement.

Preferable another aspect of the above-mentioned method exists in that the relation between the ultrasonic speed $v_{ref}$ in the medium and the medium temperature $T_{ref}$ is obtained in the by-pass after the by-pass is flooded with the medium present in the test piece measuring section and then the by-pass is de-coupled in terms of flow from the test piece measuring section by means of the stop valves. Using this approach, the temperature dependency of the ultrasonic speed can be detected very accurately in the by-pass and particularly without running the risk that the reference measurement influences the actual calibration process.

Since the temperature measurement by means of the invasive reference temperature-measuring device is particularly highly accurate, but comparably slow, a preferred aspect of the method provides that a stationary temperature state of the resting or also flowing medium is watched for in the by-pass. In particular a stationary state in view of the medium temperature determined with the reference temperature-measuring device before the relation $v_{ref}=f(T_{ref})$ between the ultrasonic speed $v_{ref}$ in the medium and the medium temperature $T_{ref}$ is determined and approved for use in the ultrasonic temperature-measuring device in the test piece measuring section. The stationary state of the medium can be detected because successive reference measurements have to fall below a pre-determined maximum change threshold so that the reference measurement is accepted as such and goes into the revealed relation between the ultrasonic speed in the medium and the medium temperature.

It is of particular advantage that the relation between the medium temperature and the sonic velocity within the medium exists in the form of a characteristic curve, wherein further influencing factors, such as pressure, for example, can be taken into account. Insofar, it is provided in a preferred embodiment of the invention that multiple temperatures are adjusted subsequently in the by-pass, in particular while using a conveying device and/or a heating device and/or a cooling device for the medium provided in the by-pass or by-pass loop and multiple relations $v_{ref}=f(T_{ref})$ between the ultrasonic speed $v_{ref}$ in the medium and the medium temperature $T_{ref}$ are obtained. In particular, the medium pressure is also measured and noted for every detected correlation.

The present invention is described in the detailed description which follows, with reference to the accompany drawings which show, by way of non-limiting examples, exemplary embodiments of the present invention.

DETAILED DESCRIPTION OF THE INVENTION

Figure 1:
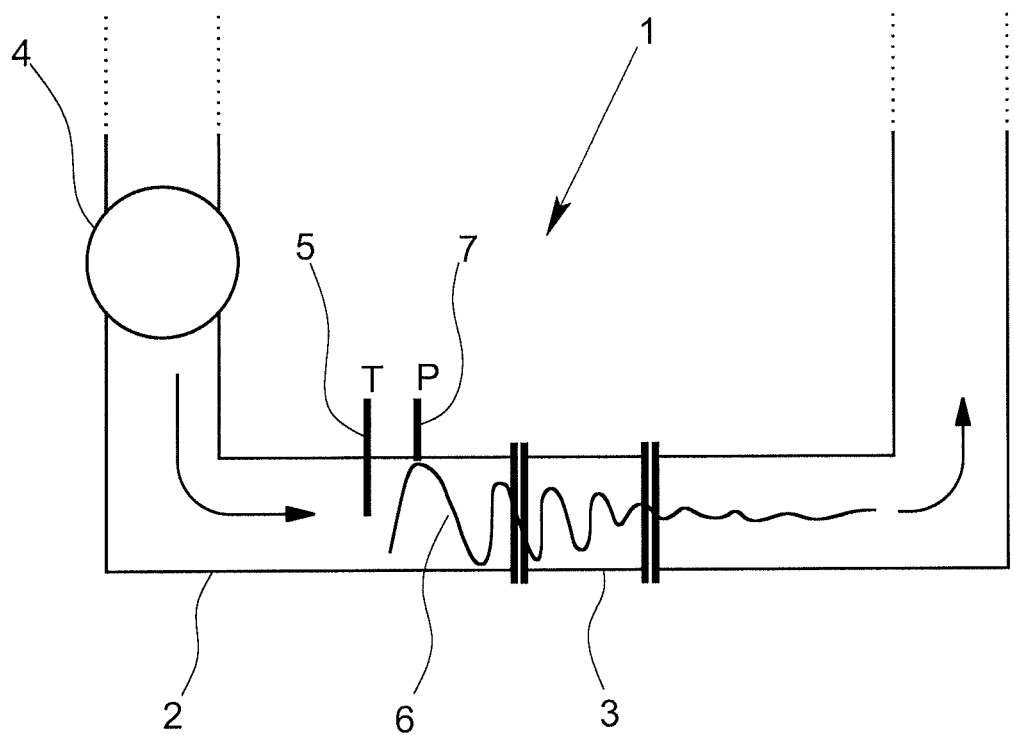
FIG. 1 shows a schematic representation of a calibration device known from the related art.

In FIG. 1, a known calibration device 1 from the related art is shown schematically. The calibration device has a test piece measuring section 2 in which a mass flow meter test piece 3 to be calibrated can be inserted and is presently inserted. The calibration device 1 additionally has a device 4 for creating a flow of a medium through the test piece measuring section 2. By way of non-limiting example, the device 4 can be a pump. Furthermore, the calibration device 1 has a temperature-measuring device 5 in the test piece measuring section 2 that is in immediate proximity to the mass flow meter test piece 3. The temperature measuring device 5 serves to detect the temperature of the medium.

The temperature-measuring device 5 in FIG. 1 is an invasive temperature-measuring sensor that extends into the volume of the test piece measuring section 2. For example, the temperature-measuring device 5 can be designed as an enclosed PT100 resistance element. The temperature measurement is particularly highly accurate with such an invasive temperature receiver. However, the invasive temperature receiver has the disadvantage that the measurement only occurs at points in a small section of the flow cross-section. Furthermore, the invasive temperature receiver has the additional disadvantage that the flow is influenced by the sensor extending into the volume of the test piece measuring section 2, so that disturbances 6 are induced in the practically interference-free flow downstream from the temperature-measuring device 5.

The calibration device 1 also has a pressure sensor 7, which is provided on the circumference of the tube wall of the test piece measuring section 2, but does not extend into the volume of the test piece measuring section 2. The pressure is, in particular for gaseous media, an essential variable for determining the mass flow and for determining the pressure-dependent parameters of the medium.

The temperature-measuring device 5 is provided very close to the mass flow meter test piece 3, so that an exact impression of the temperature conditions of the medium can be obtained in immediate proximity of the mass flow meter test piece 3.

Also, calibration device 1 generally has a standard measuring device, wherein the results of the mass flow meter test piece 3 are compared with the measurements of the standard measuring device. In other known calibration devices, a volumetric standard is used, for example in the form of a plunger system, in which a defined flow can be adjusted, in which the plungers of the volumetric standard displace a certain medium volume in a certain time and press through the test piece measuring section. This is not shown in detail here, since these details are not important for essential points of the calibration device 1 according to the invention.

Figure 2:
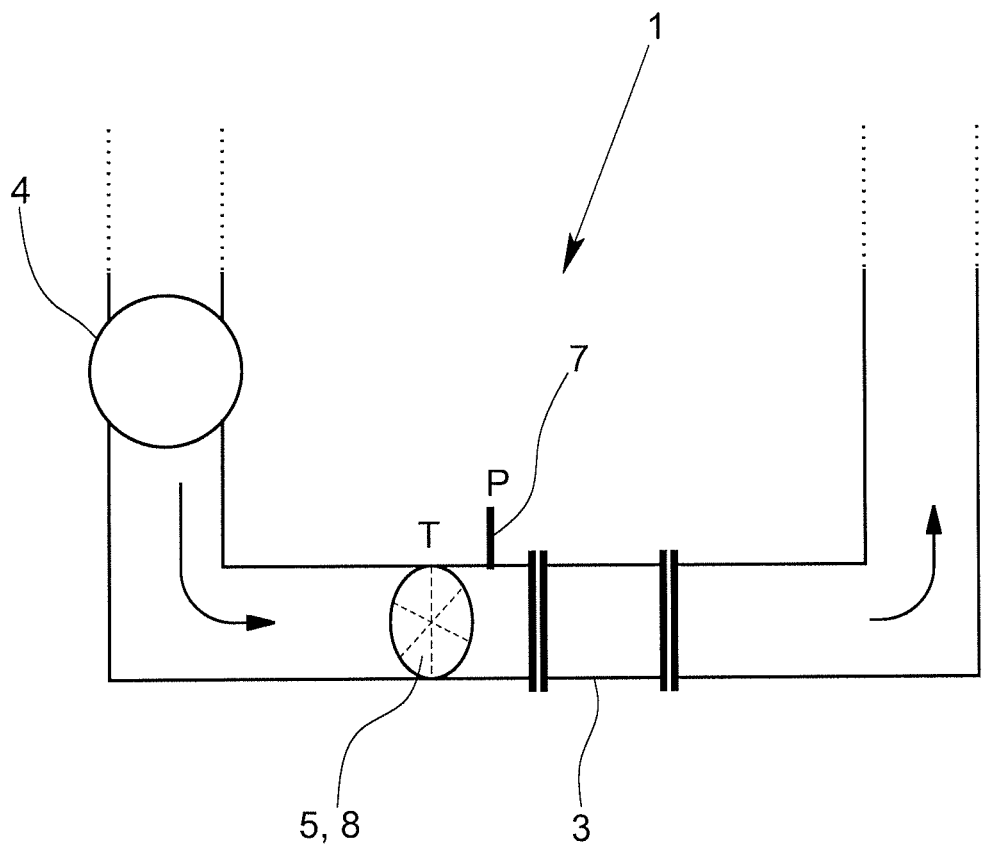
FIG. 2 shows a schematic calibration device according to an embodiment of the invention with an ultrasonic temperature-measuring device.

A calibration device 1 according to the invention is shown in FIG. 2 and differs from the calibration device 1 known from the related art according to FIG. 1 in that the temperature-measuring device 5 is designed as an ultrasonic temperature-measuring device 8. Consequently, the use of an ultrasonic temperature-measuring device 8 enables the calibration device 1 to obtain a medium temperature that is determined using the speed of an emitted ultrasonic signal in the medium. The ultrasonic signals emitted from the ultrasonic temperature-measuring device 8 moves in the medium practically without disturbance. It is important that the ultrasonic temperature-measuring device 8 does not extend into the flow cross-section of the test piece measuring section 2, so that the flow in the test piece measuring section 2 is essentially not influenced by the ultrasonic temperature-measuring device 8.

The advantage of the ultrasonic temperature-measuring device 8 and its use in immediate proximity to the mass flow meter test piece 3 is that the information about the ultrasonic speed, and thus, about the temperature, is present practically without delay. This advantage is achieved because a sensor and its casing do not have to be heated first by the medium e.g., an invasive temperature-measuring device of the related art, rather the medium is measured practically by itself using the propagation speed of the acoustic noise.

A further advantage of using the ultrasonic temperature-measuring device 8 is that the running time of the ultrasonic signal is always measured via the signal path. Consequently, the running time is measured automatically and the average temperature along the signal path is determinable. Thus, the ultrasonic temperature-measuring device 8 does not only give a selective impression of the temperature, but rather provides an average overall temperature via the signal path. The signal paths of the ultrasonic temperature-measuring device 8 implemented and shown here run substantially perpendicular to the flow of the medium within the calibration device 1.

However, by using the ultrasonic temperature-measuring devices 8 for determining the temperature of a medium there can be a problem in that the relationship between the medium temperature and the ultrasonic speed in the medium is very dependent on the medium used. Consequently, the relationship has to be known in order to obtain the speed, and thus, the temperature in the medium, as a result of measuring the running time of the ultrasonic signal.

Accordingly, in the calibration devices 1 according to FIGS. 3a-5, it is provided that an invasive reference temperature-measuring device 9 and an associated reference ultrasonic temperature-measuring device 10 are arranged adjacent to one another in the calibration device 1, so that the variables medium temperature $T_{ref}$ and ultrasonic speed $v_{ref}$ can be detected metrologically by the reference measuring devices 9 and 10 practically at one location; "adjacent to one another" is to be understood in this sense.

The reference temperature-measuring device 9 and the associated reference ultrasonic temperature-measuring device 10 are additionally arranged in the calibration device 1 in such a manner that the flow in the test piece measuring section 2 in the area of the ultrasonic temperature-measuring device 8 and the area of the mass flow meter test piece 3 is essentially not influenced by the invasive reference temperature-measuring device 9. For example, the reference temperature-measuring device 9 and the associated reference ultrasonic temperature-measuring device 10 can be arranged a predetermined distance upstream or downstream from the area of the ultrasonic temperature-measuring device 8 and the area of the mass flow meter test piece 3. Thus, the ultrasonic speed $v_{ref}$ in the medium at the medium temperature $T_{ref}$ determined by the invasive reference temperature-measuring device 9 is determined with the reference ultrasonic temperature-measuring device 10.

This configuration for measuring the medium temperature $T_{ref}$ and the ultrasonic speed $v_{ref}$ allows for the advantages of the highly exact invasive reference temperature-measuring device 9, which is arranged away from the mass flow meter test piece 3, and the ultrasonic temperature-measuring device 8, to be combined with the quick ultrasonic temperature-measuring device 8 that makes an average via the cross-section in the proximity of the mass flow meter test piece 3 to be calibrated. This advantage is achieved because the relationship between the medium temperature and the ultrasonic speed can be determined in the medium via the reference ultrasonic temperature-measuring device 10 provided adjacent to the invasive reference temperature-measuring device 9.

Figure 3A:
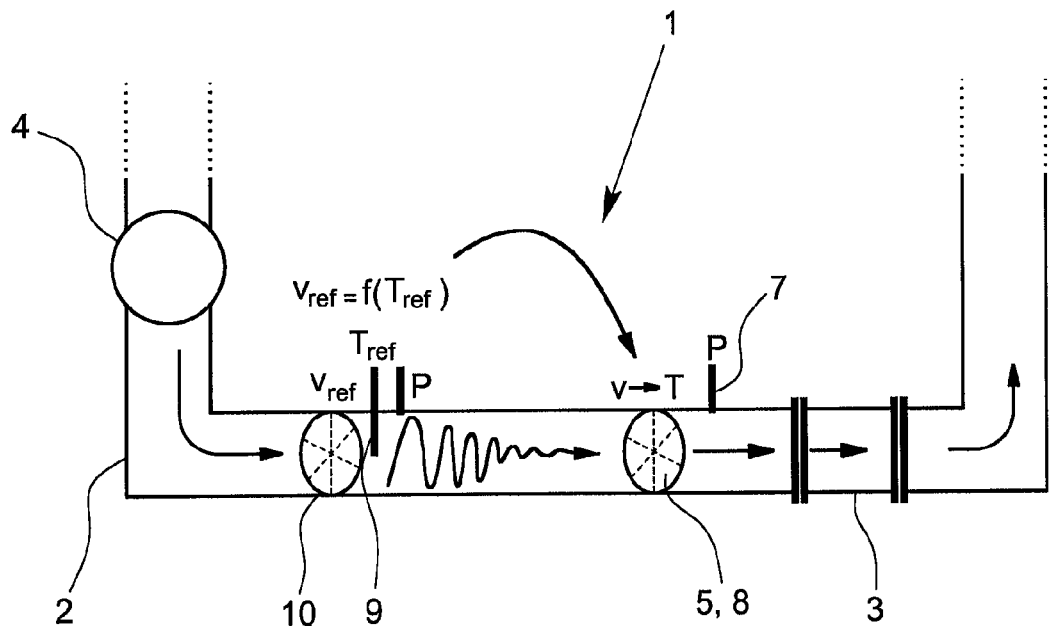
FIGS. 3a & 3b show a schematic calibration device according to another embodiment of the invention with a reference measuring device in the test piece measuring section.

The invasive reference temperature-measuring device 9 and the associated reference ultrasonic temperature-measuring device 10 are arranged downstream from the ultrasonic temperature-measuring device 8 and the mass flow meter test piece 3 to be calibrated in FIG. 3a. However, the invasive reference temperature-measuring device 9 and the associated reference ultrasonic temperature-measuring device 10 are so far away from the mass flow meter test piece 3 that the disturbances 6 in the flow induced by the invasive reference temperature-measuring device 9 are practically dissipated in the area of the mass flow meter test piece 3 to be calibrated and the ultrasonic temperature-measuring device 8.

Figure 3B:
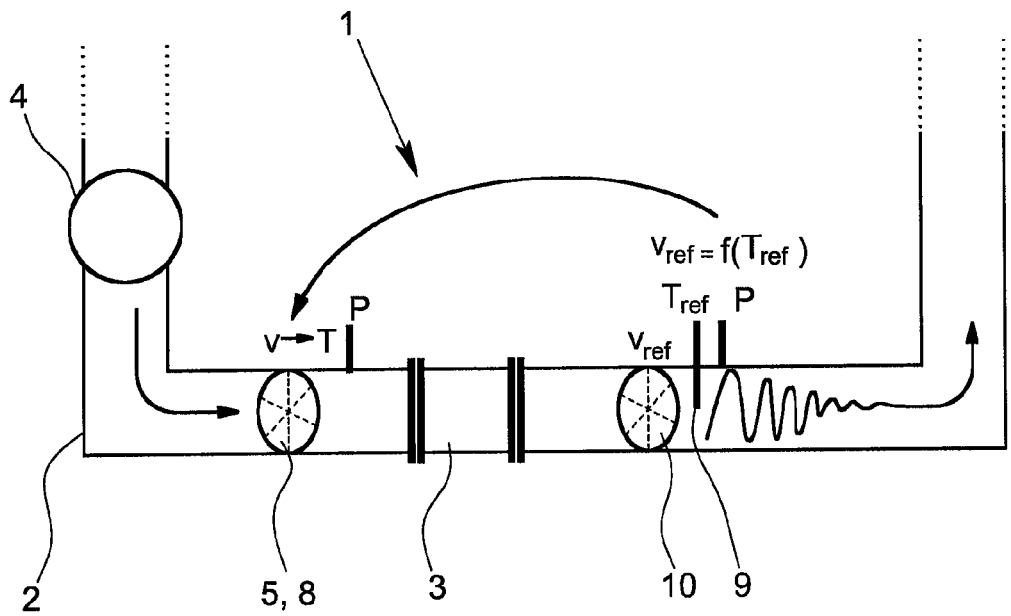

In contrast, the invasive reference temperature-measuring device 9 and the associated reference ultrasonic temperature-measuring device 10 are arranged downstream from the mass flow meter test piece 3 in the calibration device 1 according to FIG. 3b, so that the induced disturbances 6 cannot easily make their way to the area of the mass flow meter test piece 3 to be calibrated and the ultrasonic temperature-measuring device 8. The calibration devices 1 according to FIGS. 3a and 3b are designed such that the relation $v_{ref}=f(T_{ref})$ between the ultrasonic speed $v_{ref}$ in the medium and the medium temperature $T_{ref}$ obtained from the reference measurement forms the basis for the temperature measurement with the ultrasonic temperature-measuring device 8 in the test piece measuring section 2, i.e. this relationship is taken into account in the evaluation of the signal running times obtained by the ultrasonic temperature-measuring device 8, which is indicated in FIGS. 3a and 3b by the curvy arrow.

In practice, the calibration device 1 has an evaluation unit not shown here, in which the measurement data for the ultrasonic temperature-measuring device 8, the invasive reference temperature-measuring device 9 and the associated reference ultrasonic temperature-measuring device 10 are centrally detected and further processed as described above. In the embodiments according to FIGS. 3a and 3b, the influence-free arrangement of the invasive reference temperature-measuring device 9 and the associated reference ultrasonic temperature-measuring device 10 is implemented in that both reference measuring devices 9 and 10 are arranged in the test piece measuring section 2 and arranged practically with enough distance to the mass flow meter test piece 3 and the ultrasonic temperature-measuring device 8 in the test piece measuring section 2 so that the reference measurements and the calibration measurements can be carried out simultaneously. If the reference measurement is to be carried out with the invasive reference temperature-measuring device 9 and the associated reference ultrasonic temperature-measuring device 10 for determining the relation $v_{ref}=f(T_{ref})$, then the measurement is to be carried out using the entire calibration device 1.

Figure 4A:
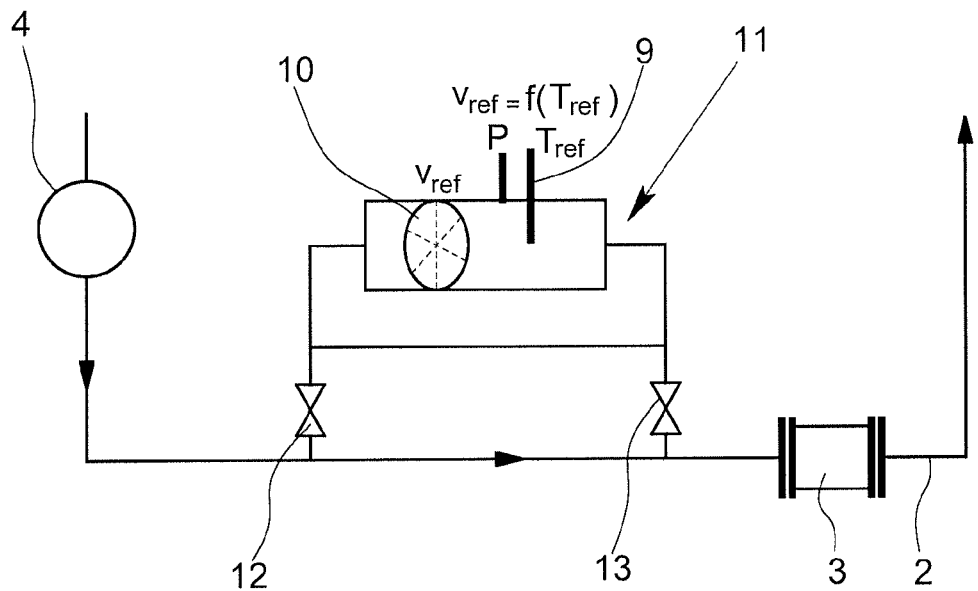
FIGS. 4a & 4b show a schematic calibration device according to another embodiment of the invention with a reference measuring device in a by-pass to the test piece measuring section.
Figure 4B:
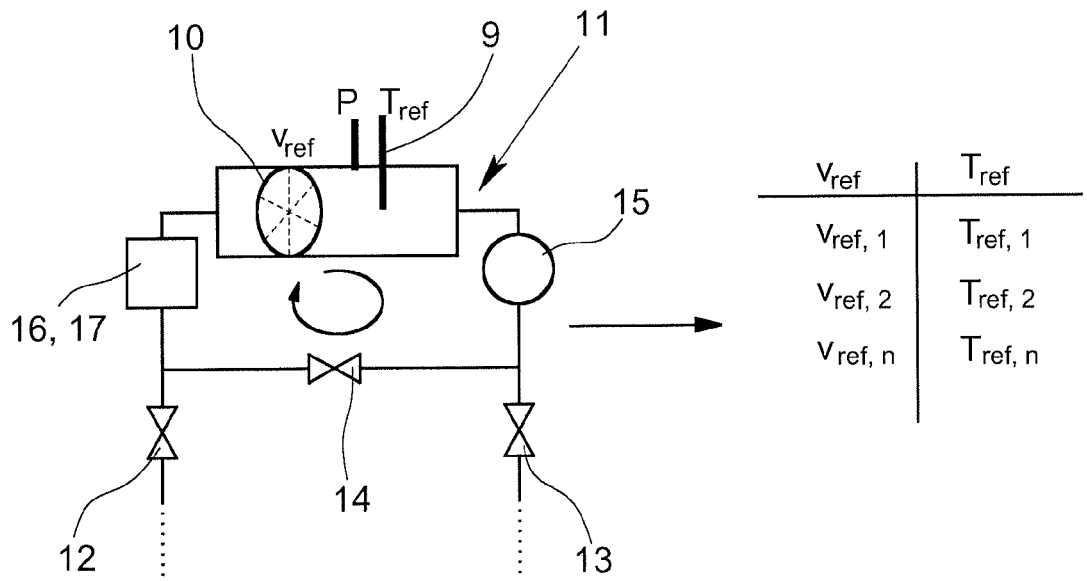
Figure 5:
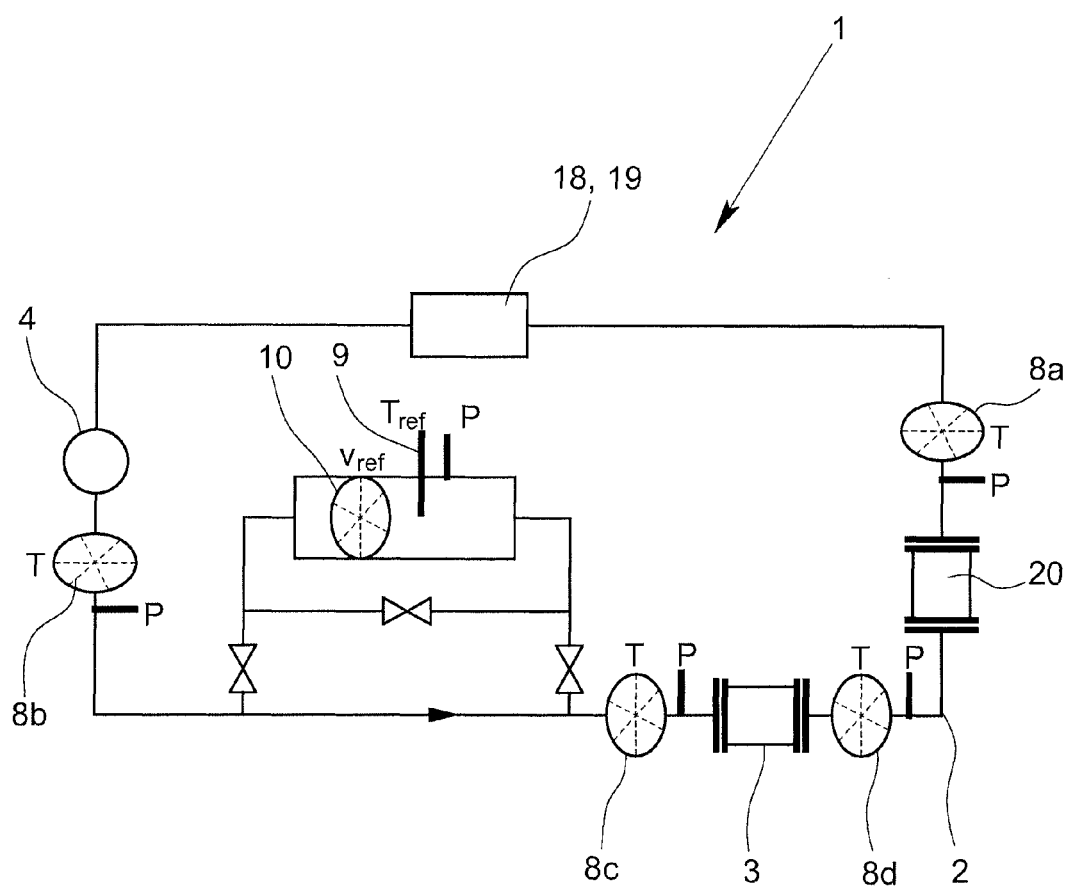
FIG. 5 shows a further schematic representation of another embodiment of the calibration device according to the invention.

Most of the flow tubes of the calibration device 1 are shown only as lines in FIGS. 4 and 5. It is provided in the calibration devices 1 according to FIGS. 4a, 4b and 5 that a by-pass 11 to the test piece measuring section 2 is implemented. The invasive reference temperature-measuring device 9 and the associated reference ultrasonic temperature-measuring device 10 are arranged in the by-pass 11; only this part of the tube system is shown two-dimensionally.

Further, it is provided in the calibration device 1 that the by-pass 11 can be de-coupled from the test piece measuring section 2 in terms of flow by means of stop valves 12, 13 and 14. The operation of the invasive reference temperature-measuring device 9 in the by-pass allows a very simple, effective and far-reaching isolation of the reference measurement from the measurement in the test piece measuring section 2. This is particularly the case when the stop valves 12 and 13 prevent any flow-related interaction between the by-pass 11 and the test piece measuring section 2.

The design of the by-pass 11 shown in FIG. 4b is of particular advantage, in which the by-pass 11 forms a by-pass loop, in which a conveying device 15 in the form of, by way of non-limiting example is a pump, and a combined heating and cooling device 16 and 17 for the medium are provided. Using a by-pass loop that is designed in such a manner, it is possible to always mix and homogenize the medium such that a stationary state of the medium can be set in the by-pass 11. The stationary state of the medium allows for the invasive reference temperature-measuring device 9, which is highly accurate, but slow, to obtain a stationary temperature measurement, so that correlations between the medium temperature $T_{ref}$ and the ultrasonic propagation speed $v_{ref}$ in the medium can be determined with high accuracy. These correlations can be determined for different temperatures and dependent on other parameters, such as the pressure P of the medium, for example, so that characteristic curves can be gathered for the quick ultrasonic temperature-measuring device 8 practically de-coupled from the test piece measuring section 2 with the by-pass loop, indicated in the value table with $v_{ref,i}$, $T_{ref,i}$. The shown by-pass 11 is loaded with the medium at regular intervals in the test piece measuring section 2, so that it is always guaranteed that the medium used in the test piece measuring section 2 for calibration is also the medium forming the basis for the reference measurements in the by-pass 11.

The calibration device 1 according to FIG. 5 shows a test piece measuring section 2 designed as a test piece measuring section loop, which additionally has a combined heating and cooling device 18 and 19 for the medium. Furthermore, a mass flow meter 20 is also provided as a working standard. In this manner, the calibration device 1 can be operated practically at any flow and state of the medium, which allows for a comprehensive calibration of the mass flow meter test piece 3. As can be seen in FIG. 5, multiple ultrasonic temperature-measuring devices 8a, 8b, 8c and 8d are arranged in the direction of flow spaced from one another in the test piece measuring section 2, so that a temperature curve within the test piece measuring section 2 can be detected. This is of particular interest when, for example, the changing geometry of the calibration device 1, in particular caused by temperature influences, has to be compensated.

Figure 6:
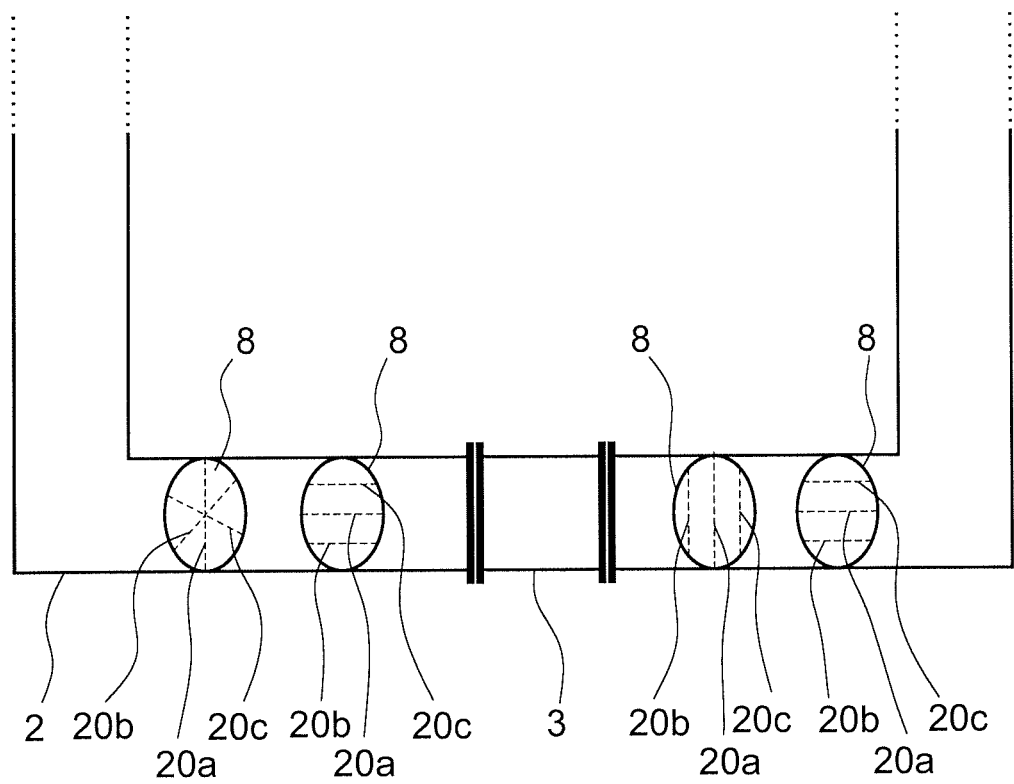
FIG. 6 shows a schematic section of another embodiment of the calibration device according to the invention with attention to the particular design of the ultrasonic temperature-measuring device.

In FIG. 6, it is shown schematically that the ultrasonic temperature-measuring device 8 has multiple ultrasonic measuring paths 20a, 20b and 20c through a cross-section of the test piece measuring section 2 in the test piece measuring section. The ultrasonic measuring paths 20a, 20b and 20c run radially or parallel through the cross-section of the test piece measuring section. For this reason, it is possible in the case of the radial ultrasonic measuring paths 20a, 20b and 20c to measure the average of the entire flow cross-section, wherein simultaneously layering effects within the flow, in particular layering effects due to gravitation, can be taken into account practically. The alignment of the parallel measuring paths 20a, 20b and 20c allow, in turn, specific boundary current effects to be acknowledged and taken into account in further measurements.

What is claimed is:

1. A calibration device for mass flow meters comprising:
   at least one test piece measuring section having a flow-through area and being constructed to hold a test piece to be calibrated within the flow-through area;
   at least one device for creating a flow of a medium through the flow-through area of the at least one test piece measuring section; and
   at least one temperature-measuring device for detecting a temperature of the medium, the at least one temperature-measuring device being arranged in the test piece measuring section with the at least one temperature-measuring device located outside of the flow-through area,
   wherein the at least one temperature-measuring device is an ultrasonic temperature-measuring device that is configured to emit an ultrasonic signal into the medium and determine the temperature of the medium by measuring a speed of the emitted ultrasonic signal,
   further comprising:
   an invasive reference temperature-measuring device for determining a medium temperature ($T_{ref}$);
   a reference ultrasonic temperature-measuring device arranged adjacent to the invasive reference temperature-measuring device for determining an ultrasonic speed ($v_{ref}$) in the medium at the medium temperature ($T_{ref}$), and
   means for obtaining a relationship ($v_{ref}=f(T_{ref})$) between the ultrasonic speed ($v_{ref}$) in the medium determined by the reference ultrasonic temperature-measuring device and the medium temperature (Tref) determined by the invasive reference temperature-measuring device and utilizing the obtained relationship ($v_{ref}=f(T_{ref})$) as a basis for the temperature measurement with the ultrasonic temperature-measuring device in the at least one test piece measuring section.

2. The calibration device according to claim 1, wherein the invasive reference temperature-measuring device and the reference ultrasonic temperature-measuring device are arranged in the at least one test piece measuring section.

3. The calibration device according to claim 1, further comprising a by-pass to the test piece measuring section, wherein the invasive reference temperature-measuring device and the reference ultrasonic temperature-measuring device are arranged in the by-pass.

4. The calibration device according to claim 3, further comprising at least one stop valve that is constructed in a manner to decouple the by-pass from the at least one test piece measuring section.

5. The calibration device according to claim 4, wherein:
   the by-pass is constructed as a by-pass loop, and
   the by-pass loop comprises at least one of a conveying device, a heating device, or a cooling device.

6. The calibration device according to claim 5, wherein:
   the at least one test piece measuring section is constructed as a test piece measuring loop, and
   the test piece measuring loop comprises at least one of a conveying device, a heating device, or a cooling device.

7. The calibration device according to claim 6, wherein:
   at least one of the ultrasonic temperature-measuring device or the reference ultrasonic temperature-measuring device includes a plurality of ultrasonic measurement paths through the flow-through area of the at least one test piece measuring section or through a flow-through area of the by-pass loop, and
   the plurality of ultrasonic measurement paths run radial or parallel through the flow-through area of the at least one test piece measuring section or the by-pass loop.

8. The calibration device according to claim 3, wherein:
   the by-pass is constructed as a by-pass loop, and
   the by-pass loop comprises at least one of a conveying device, a heating device, or a cooling device.

9. The calibration device according to claim 8, wherein:
   the at least one test piece measuring section is constructed as a test piece measuring loop, and
   the test piece measuring loop comprises at least one of a conveying device, a heating device, or a cooling device.

10. The calibration device according to claim 9, wherein:
    at least one of the ultrasonic temperature-measuring device or the reference ultrasonic temperature-measuring device includes a plurality of ultrasonic measurement paths through the flow-through area of the at least one test piece measuring section or through a flow-through area of the by-pass loop, and
    the plurality of ultrasonic measurement paths run radial or parallel through the flow through area of the at least one test piece measuring section or the by-pass loop.

11. The calibration device according to claim 10, wherein the ultrasonic temperature-measuring device comprises a plurality of ultrasonic temperature-measuring devices that are arranged spaced from one another in the at least one test piece measuring section.

* * * * *